United States Patent [19]
Eckenbrecht

[11] Patent Number: 4,788,586
[45] Date of Patent: Nov. 29, 1988

[54] CONTROLLER FOR ADJUSTING COLOR HUE AND SATURATION OF IMAGES GENERATED FROM SIGNALS IN A NON-BROADCASTING VIDEO SYSTEM

[75] Inventor: Robert R. Eckenbrecht, East Bethany, N.Y.

[73] Assignee: Eastman Kodak Company, Rochester, N.Y.

[21] Appl. No.: 100,801

[22] Filed: Sep. 24, 1987

[51] Int. Cl.[4] .............................................. H04N 9/68
[52] U.S. Cl. ......................................... 358/28; 358/27
[58] Field of Search ..................................... 358/27, 28

[56] References Cited

U.S. PATENT DOCUMENTS

| | | | |
|---|---|---|---|
| 3,536,827 | 10/1970 | Bell | 358/28 |
| 3,588,827 | 6/1971 | Van Roessel | 358/28 |
| 3,617,620 | 11/1971 | Arimura | 358/28 |
| 3,689,689 | 9/1972 | Weitzsch | 178/5.2 |
| 3,729,578 | 4/1973 | Slusarski | 178/5.4 |
| 3,749,825 | 7/1973 | Moore | 178/5.4 |
| 4,219,840 | 8/1980 | Srivastava | 358/28 |
| 4,542,402 | 10/1985 | Ader | 358/30 |
| 4,550,339 | 10/1985 | Fling | 358/28 |
| 4,554,576 | 11/1985 | Kao | 358/28 |
| 4,558,351 | 12/1985 | Fling et al. | 358/28 |
| 4,562,460 | 12/1985 | Harwood | 358/28 |
| 4,568,967 | 2/1986 | Freyberger et al. | 358/27 |
| 4,568,968 | 2/1986 | Ullrich | 358/30 |
| 4,633,299 | 12/1986 | Tanaka | 358/29 |
| 4,644,389 | 2/1987 | Nakagawa et al. | 358/28 |
| 4,679,072 | 7/1987 | Takayama | 358/27 |

FOREIGN PATENT DOCUMENTS

| | | | |
|---|---|---|---|
| 163995 | 9/1984 | Japan | 358/28 |
| 196686 | 11/1984 | Japan | 358/28 |

Primary Examiner—John W. Shepperd
Attorney, Agent, or Firm—Robert H. Sproule

[57] ABSTRACT

A color tint controller for a closed circuit video system receives red and blue color difference signals and selectively changes the amplitudes of these signals to adjust the color of a displayed image. This is accomplished by changing the levels of the red color difference signals in a first direction, and changing the levels of the blue color difference signals in a second opposite direction, and then adding these changed signals to generate an adjusted red difference signal which is fed into a RGB matrix. At the same time, the levels of the blue difference signals are changed in the first direction and the levels of the red color difference signals are changed in the second direction, and these two signals are combined to form an adjusted blue difference signal which is also fed to the RGB matrix. The changing of the various color difference signals in different directions is performed in various multiplier circuits responsive to a corresponding set of control signals or multiplier coefficients with which the various color difference signals are multiplied. The various control signals are generated from a differential voltage created by a control potentiometer.

2 Claims, 11 Drawing Sheets

CONTROLLER FOR ADJUSTING COLOR HUE AND SATURATION OF IMAGES GENERATED FROM SIGNALS IN A NON-BROADCASTING VIDEO SYSTEM

TECHNICAL FIELD

The present invention relates to apparatus and methods for controlling color saturation and hue of images which are generated from signals in a non-broadcast environment; and more particularly, to a hue and saturation controller which is used in conjunction with a camera that outputs image signals which are recorded and displayed in a closed-circuit video system.

BACKGROUND OF THE INVENTION

It is common knowledge that in a conventional television broadcast system color control is a function of the phase and amplitude of the chrominance signal. More specifically, R-Y and B-Y signals generated from a camera matrix modulate respective 3.58 MHz sub-carriers which are phase shifted from each other by ninety degrees. These modulated signals are added vectorally to generate a chrominance signal having a phase angle which represents the color or hue information of the image being transmitted, and having an amplitude which represents the color saturation information.

Since color is represented by the phase angle of the chrominance signal, hue adjustment is often accomplished in a conventional television receiver by changing the phase relationship between the chrominance signal and the local 3.58 MHz color sub-carrier. This phase angle change generates changes in the amplitudes of the demodulated R-Y and B-Y components of the chrominance signal.

In a non-broadcasting video system, such as in a closed-circuit video where the signal is fed to remote units by wire, there is no need to generate a chrominance signal. Rather, the color signals out of the camera may be fed directly to an image display terminal. However, with the absence of phase angle information which is present in the chrominance signal, means other than phase angle adjustment are necessary in the closed circuit in order to control the color hue.

A number of conventional color adjusting devices have been disclosed. For example, a color correction circuit is set forth in U.S. Pat. No. 3,729,578 by Slusarski wherein R-Y and B-Y signals are clipped, and the clipped portions are then added to or subtracted from the R-Y, B-Y and G-Y signals to produce the desired color changes.

Weitzsch, in U.S. Pat. No. 3,689,689 discloses a color correction circuit whereby skin color and green intensity are adjusted by changing the color signal voltages.

Color correction is also disclosed in U.S. Pat. No. 4,219,840 by Srivastava which utilizes a color modifier which reduces the gain of the B-Y signal and adds a −(B-Y) component to the B-Y demodulator output.

Color correction is further disclosed by Moore in U.S. Pat. No. 3,749,825 whereby portions of the R-Y and G-Y signals are summed with the B-Y signal to achieve the desired color change.

In U.S. Pat. No. 4,633,299 by Tanaka, color correction is accomplished by detecting the color saturation level of a color signal and increasing a color component on the screen in response to the detected saturation increase.

A circuit for adjusting color hue by rotating the vector sum of the color mixture signals is disclosed in U.S. Pat. No. 4,562,460 by Harwood.

Freyberger et al., in U.S. Pat. No. 4,568,967, discloses a digital color signal processor which multiplies two demodulated digital color difference signals by a previously multiplied digital color saturation signal, to generate three time division-multiplexed signals which are added to the luminance signal and then processed to provide the analog color signals.

A digital color hue adjustment circuit disclosed in U.S. Pat. No. 4,542,402 by Ader, includes stored coefficients which are multiplied by the color difference signals; the stored coefficients being modified by a microprocessor in response to adjustment of contrast and tint controls.

Hue correction for a digital television is also disclosed in U.S. Pat. No. 4,558,351 by Fling et al., whereby signals derived from I and Q inputs are multiplied by stored hue correction coefficients to produce corrected I and Q signals.

Other digital color circuits have been disclosed in U.S. Pat. No. 4,568,968 by Ullrich (color television matrix circuit); U.S. Pat. No. 4,644,389 by Nakagawa et al. (digital hue correction); and U.S. Pat. No. 4,550,339 by Fling (digital hue correction by changing chrominance vector angles).

SUMMARY OF THE INVENTION

The present invention pertains to a controller for changing the color hue of a video image. The controller is utilized in a closed circuit (non-broadcasting) video system which includes a conventional video camera, conventional signal matrices, and conventional CRT display, to generate changes in color hue. In the present video system, R-Y and B-Y color difference signals from the camera matrix do not modulate respective 3.58 MHz sub-carriers to generate a chrominance signal as in conventional broadcast video systems. Therefore, color hue adjustment cannot be accomplished by means of phase angle changes in the chrominance signal. Rather, in the present invention, color hue adjustment is achieved by directly changing the levels of the R-Y and B-Y color signals generated from the camera matrix.

More broadly, the present invention pertains to a video system including camera means which are responsive to light reflected from an object, for (i) generating signals which represent an image of the object, and for (ii) converting these signals to first and second color difference signals. Control means are provided for adjusting the level of the first and second color difference signals to generate a change in color of the image. The control means include first level changing means having a first input for receiving the first color difference signal and a second input for receiving the second color difference signal. The first level changing means changes the level of the first color difference signal in a first direction and generates a first signal output thereof, while changing the level of the second color difference signal in a second direction which is opposite to the first direction, and then generating a second signal output thereof. First summing means are provided for combining the first and second signal outputs to generate a first adjusted color difference signal.

The control means also includes second level changing means which have a third input for receiving the second color difference signal and a fourth input for receiving the first color difference signal. The second level changing means is coupled to the first level changing means in a manner that (i) when the level of the first color difference signal at the first output is changed in the first direction, the level of the first color difference signal received at the third output is also changed in the first direction to generate a third output; and (ii) when the level of the second color difference signal at the second output is changed in the second direction, the level of the first color difference signal received at the fourth input is also changed in the second direction, thereby generating a fourth signal output. The control means also includes second summing means for combining the third and fourth outputs to generate a second adjusted color difference signal.

The invention is characterized in that the first and second level means are coupled to each other by means of individual control signals generated from a control potentiometer, each of the level changing means comprising a multiplier circuit which receives an individual one of the control signals as a multiplier coefficient to be multiplied with a respective one of the color difference signals.

The video system further includes means for converting the first adjusted color difference and second adjusted color difference signals to red, blue and green color signals. Also provided are means which are responsive to these red, blue and green color signals, for displaying the image of the object.

It is therefor an object of the present invention to provide a color hue controller for a non-broadcasting video system.

BRIEF DESCRIPTION OF THE DRAWINGS

These and other objects and advantages of the present invention will become more readily apparent upon reading the following detailed description in conjunction with the attached drawings, in which.

DETAILED DESCRIPTION OF THE INVENTION

Figure 1:
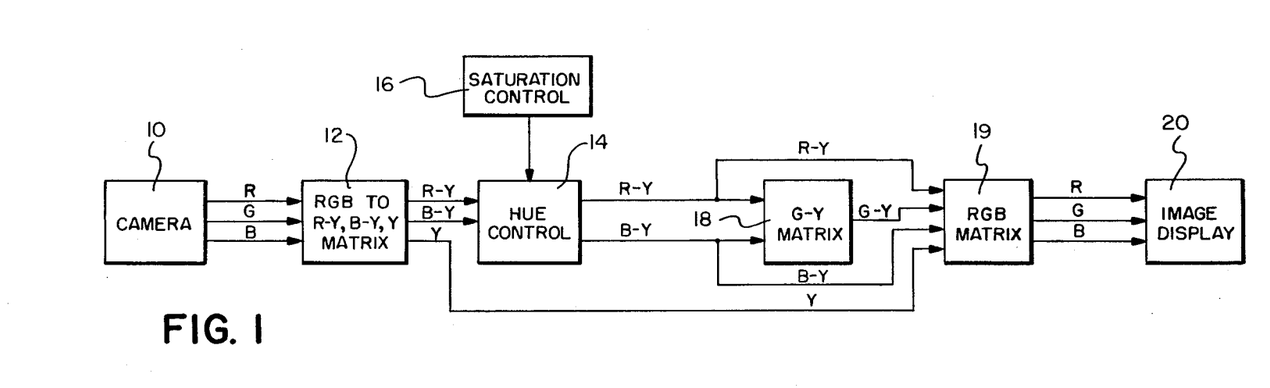
FIG. 1 is a simplified block diagram of a closed-circuit video system including the hue and saturation (gain) controllers of the present invention.

The present invention pertains to a controller for adjusting color hue and color saturation in a closed-circuit video system. By the term "closed circuit" it is meant to define a video program source that is not broadcast, but rather is fed to remote monitor units, typically by wire or the like. A closed-circuit system is shown in FIG. 1, wherein block 10 is a conventional video camera, such as a vidicon, which generates red (R), green (G), and blue (B) color signals that are converted to positive-going and negative-going R-Y and B-Y color difference signals, as well as to a luminance (Y) signal, by a conventional matrix 12. The resulting positive and negative R-Y and B-Y signals are fed to an adjustable (typically manually adjustable) color hue controller 14 of the present invention which is also responsive to an adjustable color saturation (gain) controller 16 of the present invention. By the term "hue" it is meant to describe color on the basis of the presence or absence of one or more of the primary colors, i.e., red, blue and green. On the other hand, "saturation" refers to the degree of purity of a color and its freedom from white.

In the present invention, R-Y and B-Y signals from the hue controller 14 are fed to a conventional matrix 18 where G-Y signals are generated. These G-Y signals together with the R-Y and B-Y signals from the controller 14 are then fed to a conventional RGB matrix 19 where red, blue and green color signals are generated, which in turn are fed to a conventional display device 20 such as a cathode ray tube or color image printer.

In the present invention, color hue adjustment is achieved by adjusting the amplitudes of the R-Y and B-Y signals received from the RGB-to-(R-Y)/(B-Y) matrix 12. The present invention utilizes the controller 14 which is compatible with conventional television components such as the camera 10 and matrices 12, 18 and 19, to achieve color hue adjustment. This compatibility is accomplished by duplicating those changes in the B-Y and R-Y signal levels which would have occurred as a result of a change in phase angle of a broadcast chrominance signal. This concept will be explained in further detail later.

Figure 2A:
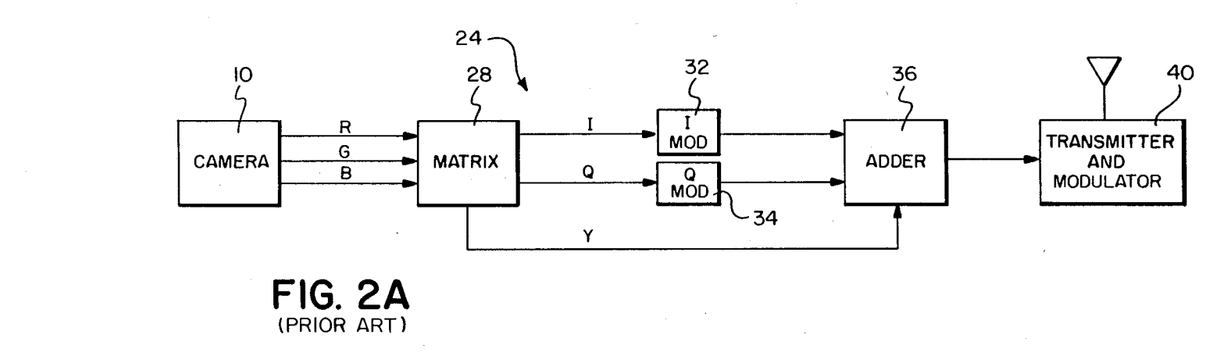
FIG. 2A is a simplified block diagram of a conventional television transmitting system.
Figure 3:
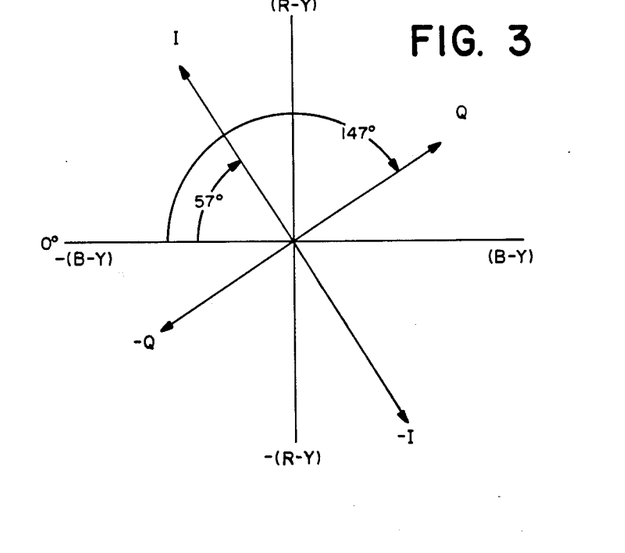
FIG. 3 is a diagram of a conventional color circle.

But first, to obtain a better appreciation of the present invention, a brief discussion of conventional broadcasting transmitter and receiver systems will be provided. Referring to FIG. 2, there is shown the conventional transmitter system generally indicated at 24 including the camera 10, which transmits red, green and blue color signals to a matrix 28 which generates band limited I and Q signals. These I and Q signals modulate respective 3.58 MHz sub-carriers, which are ninety degrees phase shifted from each other, by means of an I balanced modulator 32 and a Q balanced modulator 34. The modulated I and Q signals are then added back together with the Y signal and synchronizing information at adder 36 and fed to the transmitter 40. Color information is encoded by the selected phase angle of the modulated I, Q signals with respect to the local sub-carrier as reflected in the conventional color circle chart shown in FIG. 3.

Figure 2B:
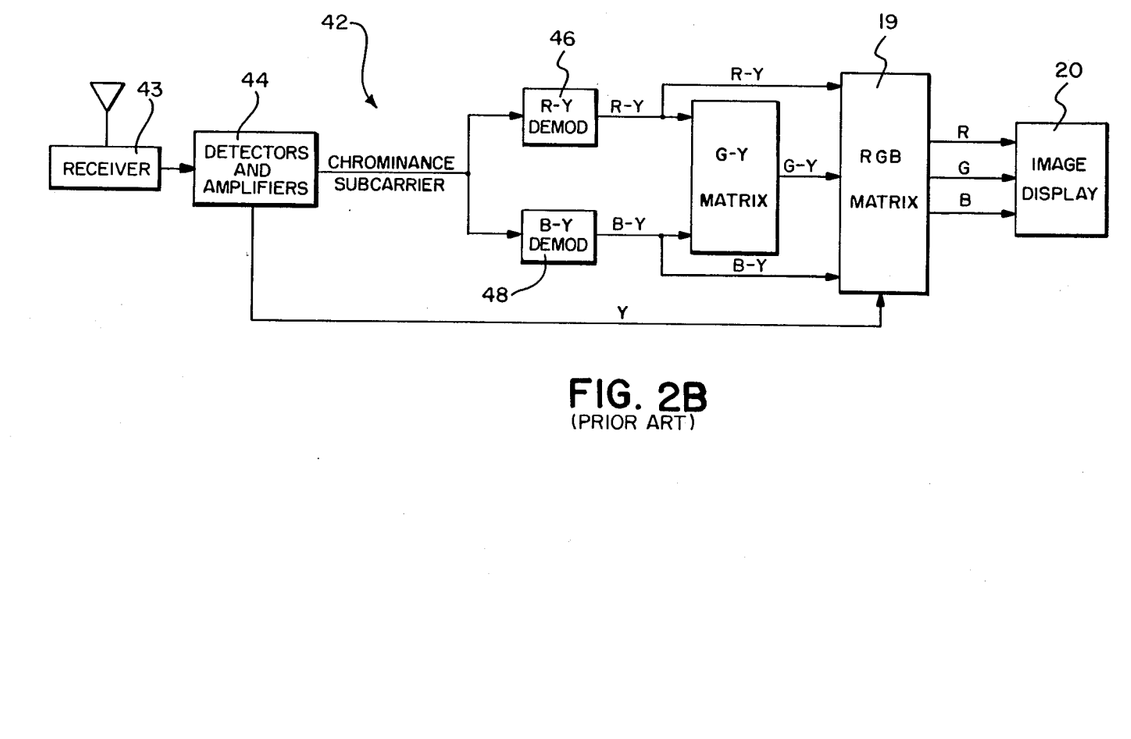
FIG. 2B is a simplified block diagram of a conventional television receiving system.

At the conventional receiver, generally indicated at 42 in FIG. 2B, the received video composite signal at block 43 is separated into luminance (Y) and chrominance signals at block 44, with the chrominance signal being fed to the B-Y demodulator 46 and R-Y demodulator 48, where it is demodulated into its B-Y and R-Y components. These components are then fed on downstream to the G-Y matrix 18, and the R-Y, B-Y and G-Y signals are fed to the RGB matrix 19, with the resulting red, blue and green signals being fed to the image display terminal 20.

Figure 4A:
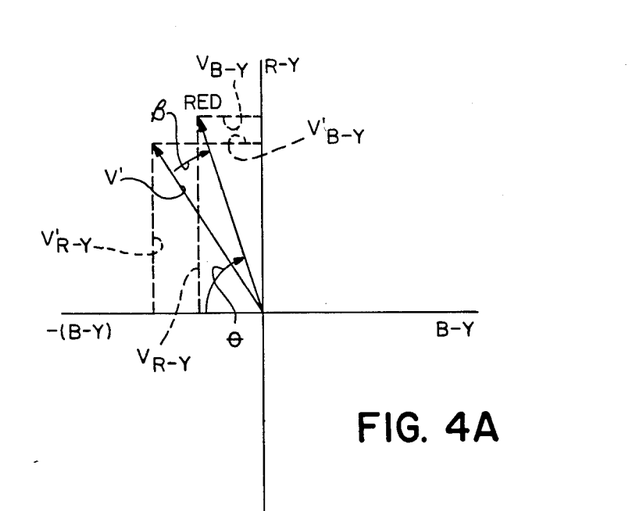
FIGS. 4A and 4B are vector diagrams showing the effects on the R-Y and B-Y component levels caused by changing the phase angles of the composite chrominance signal in the conventional manner.

As was mentioned previously, changes in color hue are accomplished conventionally by altering the phase angle of the chrominance signal relative to the local color sub-carrier. For example, the vector V in FIG. 4A represents a red chrominance signal which has a phase angle $\theta$. As shown in FIG. 4A, a decrease $\beta$ in the phase angle of the red chrominance signal causes the red chrominance vector V to shift in a counterclockwise direction to the position designated by the vector V' so that red colors become more yellow in tone. The result of the decrease $\beta$ in the phase angle $\theta$ is an increase in the $-(B-Y)$ component signal level, designated $V'_{B-Y}$, and a decrease in the R-Y component signal level, designated $V'_{R-Y}$. More precisely, the change in amplitude of the $-(B-Y)$ component level is opposite in sign to the change in amplitude of the R-Y component level.

Figure 4B:
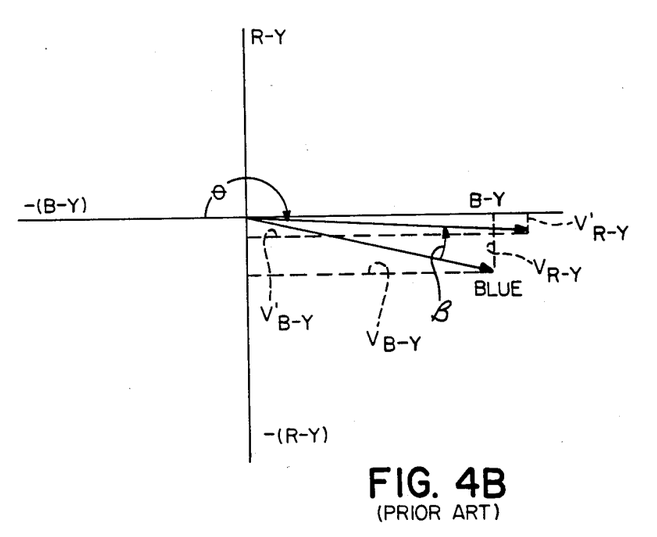

This same decrease $\beta$ in phase angle $\theta$ also causes blue colors, for example, to become more red in tone. As further shown in FIG. 4B, the phase shift $\beta$ in the blue chrominance signal from the position designated by the vector V to the position V', results in a decrease in the $-(R-Y)$ signal component, $V'_{R-Y}$, and an increase in the B-Y signal component $V'_{B-Y}$. Similarly, the change in the level of the $-(R-Y)$ component level is opposite in direction to the change in the B-Y component level. It should be apparent therefore, that phase shifts in the chrominance signal vector cause changes in the R-Y and B-Y component levels of the vector. This generates changes in color hue after the chrominance signal has been demodulated and the R-Y and B-Y components have been fed downstream to the color matrices.

Figure 5:
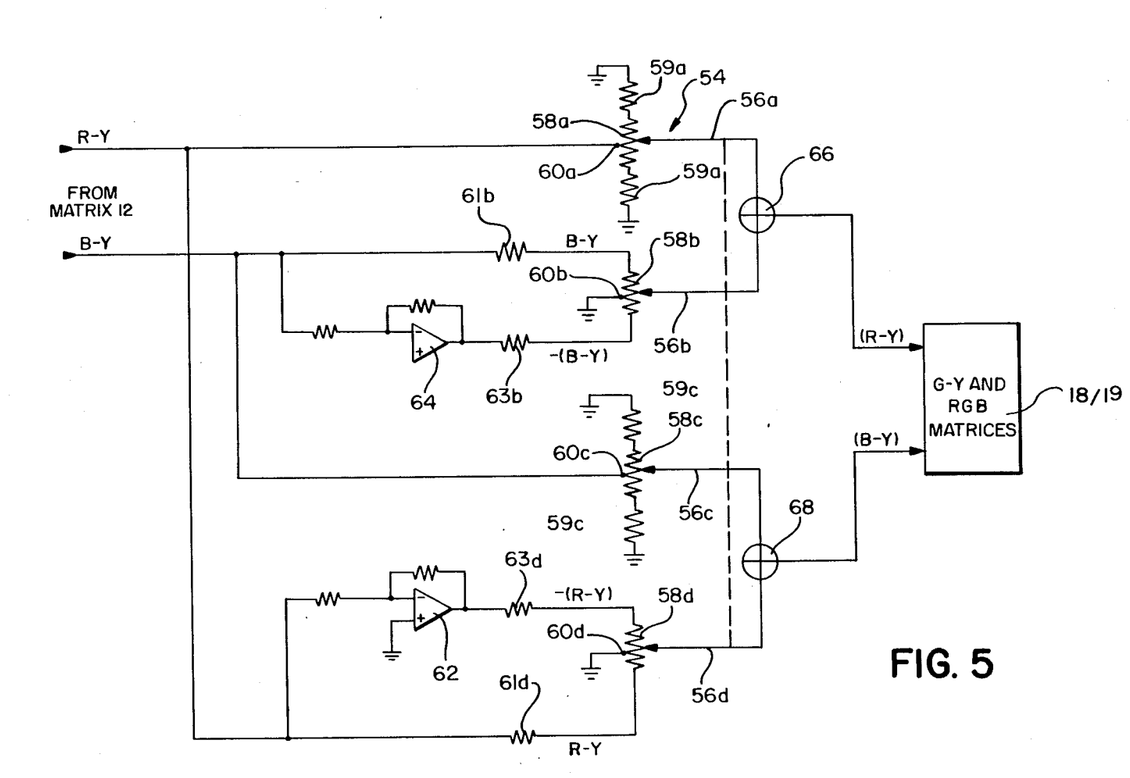
FIG. 5 is a diagram of a first exemplary embodiment of the hue controller of the present invention in a centered, nonadjusting (NOM) position.

Turning now to the present invention, there is provided the hue controller 14 which operates to generate color hue changes by implementing directly, i.e., without phase angle encoding and phase shifting, the aforementioned changes in the R-Y and B-Y component levels. Referring now to FIG. 5, there is shown a first embodiment of the color hue controller 14, including a potentiometer generally indicated at 54 having four interconnected wiper arms 56a through d, respectively, which move in unison along potentiometer resistors 58a through d, respectively, having center taps 60a through 60d, respectively. Furthermore, for reasons to be explained later, resistors 59a are tied from the opposite ends of potentiometer resistor 58a to ground, and resistors 59c are tied from the opposite ends of potentiometer resistor 58c to ground.

In order to provide a centered, nonadjusting position, potentiometer resistors 58b and 58d, respectively, have their center taps 60b, 60d tied to ground. R-Y signals from camera matrix 12 are fed directly to the first center tap 60a and to the lower end of potentiometer resistor 58d. These R-Y signals are also fed a unity gain inverting amplifier 62 to provide inverted (R-Y) signals to the upper end of potentiometer resistor 58d.

In addition, B-Y signals from camera matrix 12 are fed directly to the center tap 60c and to the upper end of potentiometer resistor 58b, as well as through an inverting amplifier 64 which feeds inverted B-Y signals to the lower end of potentiometer resistor 58b. Summing of the signals from wiper arms 56a and 56b occurs at a summer 66 which in turn is tied to the R-Y inputs of matrices 18, 19. Similarly, the summing of signals from wiper arms 56c, 56d occurs at summer 68, which in turn is tied to the B-Y inputs of matrices 18, 19.

In operation, when potentiometer 24 is in the nonadjusting position with the wiper arms 56a through d centered at the center taps 60a through d as shown in FIG. 5, the signals to wiper arms 56b, 56d are effectively shorted to ground. Furthermore, the R-Y signal to wiper arm 56a and the B-Y signal to wiper arm 56c are passed through without change because the wipers 56a, 56c are centered on the taps 60a, 60c. In this manner, the R-Y and B-Y signals from matrix 12 are fed to matrices 18, 19 without any color change.

Figure 6:
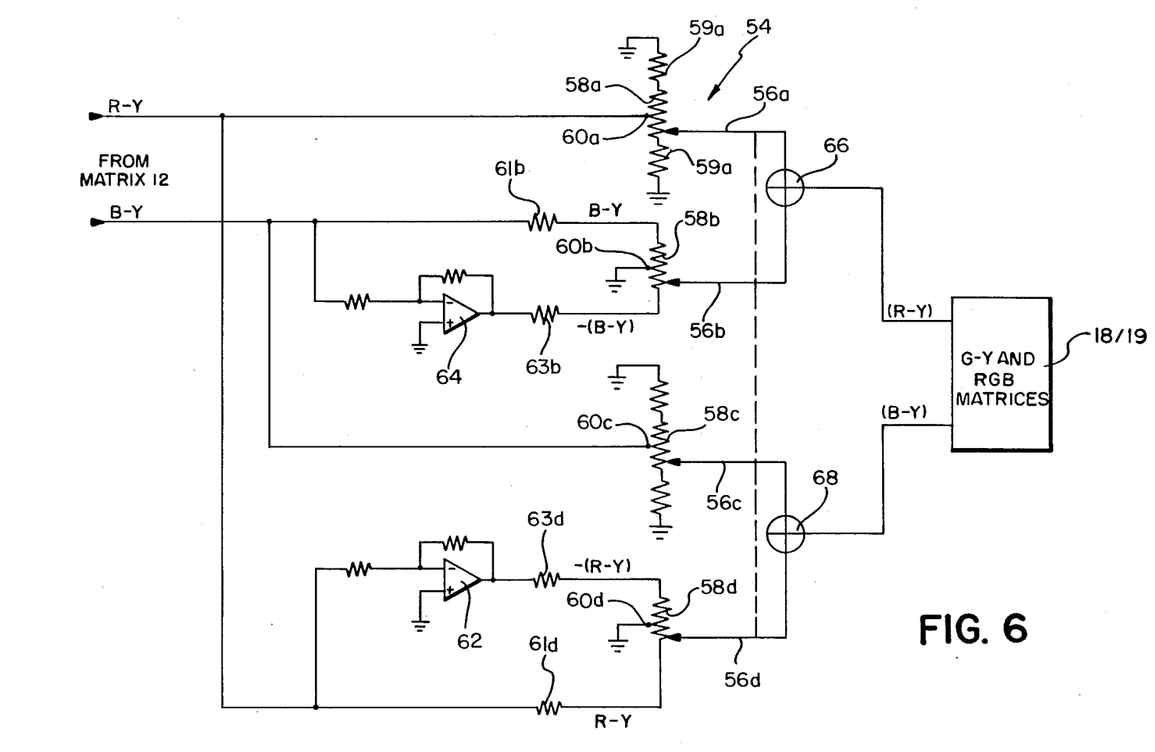
FIG. 6 is a diagram of the hue controller of FIG. 5 in an active, color adjusting position.

However, simultaneous movement of wiper arms 56a through d in the downward direction in FIG. 5, for example, to the position shown in FIG. 6, accomplishes the following; (1) it reduces the level of the R-Y signal component to arm 56a due to the voltage drop across potentiometer resistor 58a between tap 60a and the lower end of resistor 58a, (2) increases the level of the $-(B-Y)$ signal component to arm 56b due to the voltage generated across potentiometer resistor 58b between the grounded center tap 60b and the $-(B-Y)$ end of resistor 58b, (3) decreases the level of the B-Y signal component to arm 56c due to the voltage drop across potentiometer resistor 58c between tap 60c and the lower end of resistor 58c, and (4) increases the level of R-Y signal component to wiper arm 56d due to the voltage generated across potentiometer resistor 58d between the grounded center tap 60d and the R-Y end of resistor 58d. The component values of potentiometer resistors 58a through d and resistors 59a, 59c are selected so that the changes in the levels of the B-Y components are equal in magnitude to the changes in the levels of the R-Y components. These results are summarized in the table shown in FIG. 7.

Figure 7:
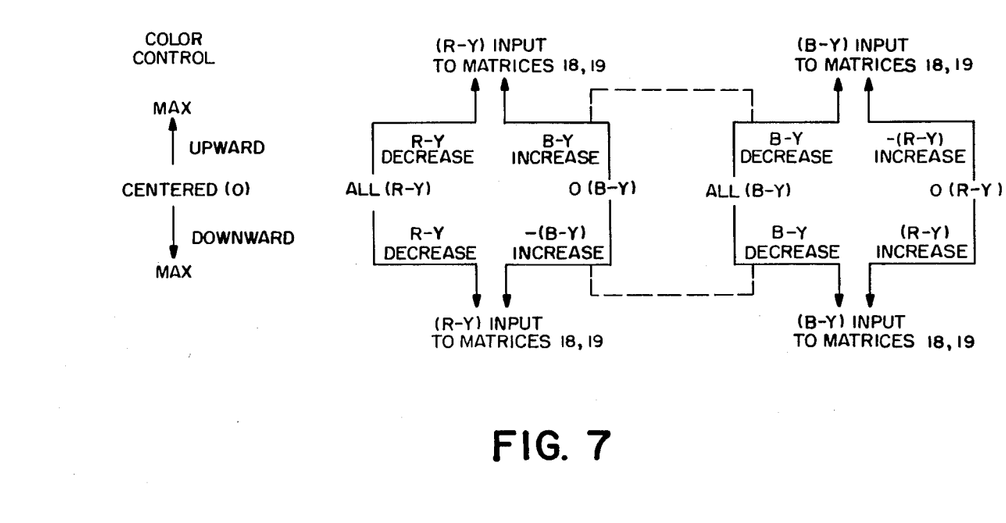
FIG. 7 is a table summarizing the signal level changes of the R-Y and B-Y color difference signals when adjusting the hue controller shown in FIGS. 4 and 5.

On the other hand, simultaneous movement of the wiper arms 56a through d in the opposite upward direction in FIG. 5, generates changes in the R-Y and B-Y component levels which are also summarized in the table in FIG. 7. That is, when the wiper arms 56a through d are moved in the upward direction above the center taps 60a through d to the upper ends of the resistors 58a through d, the following occurs: (1) the level of the R-Y signal to arm 56a is reduced, (2) the level of the B-Y signal to arm 58b is increased, (3) the level of the B-Y signal to arm 56c is reduced and (4) the level of the $-(B-Y)$ signal to arm 56d is increased. It should be apparent therefore, that the present embodiment generates changes in color hue by duplicating those changes in the signal levels of B-Y and R-Y components which are accomplished by conventional phase angle shifting of the chrominance signal and subsequent demodulation into its R-Y and B-Y components.

Since the R-Y and B-Y components represent vector components of the conventional chrominance signal, in the present invention more precise duplication of the results achieved by conventional phase angle shifting and subsequent demodulation requires vector addition of the R-Y and B-Y components at summers 66, 68 (FIG. 5). However, in an exemplary embodiment, signals from arms 56a and 56b may be added linearly by the summers 66, 68 provided that only small adjustments are made in the R-Y and B-Y component levels by the potentiometer 54. That is, if the changes in the R-Y and B-Y signal levels generated by hue controller 14 are limited to no more than about 30% of their original values over the full range of potentiometer 54, then linear addition of the B-Y and R-Y component signals is a close approximation of vector addition.

In the present embodiment, the aforementioned 30% limitation in the change in amplitude of the R-Y signal component fed to wiper arm 56a, for example, is accomplished by the upper and lower resistors 59a (FIG. 5). On the other hand, the change in the B-Y signal component fed to wiper arm 56b is limited by a resistor 61b which is tied between the B-Y input from matrix 12 and the upper end of resistor 58b; while the change in the inverted B-Y signal component fed to wiper arm 56b is limited by a resistor 63b tied between the output of amplifier 64 and the lower end of resistor 58b, and which has the same value as resistor 61b. In a similar manner, the change in the level of the B-Y component signal fed to wiper arm 56c is limited by upper and lower resistors 59c, while the changes in the levels of the R-Y and —(R-Y) signals fed to wiper arm 56d are limited by resistors 61d and 63d.

Figure 8A:
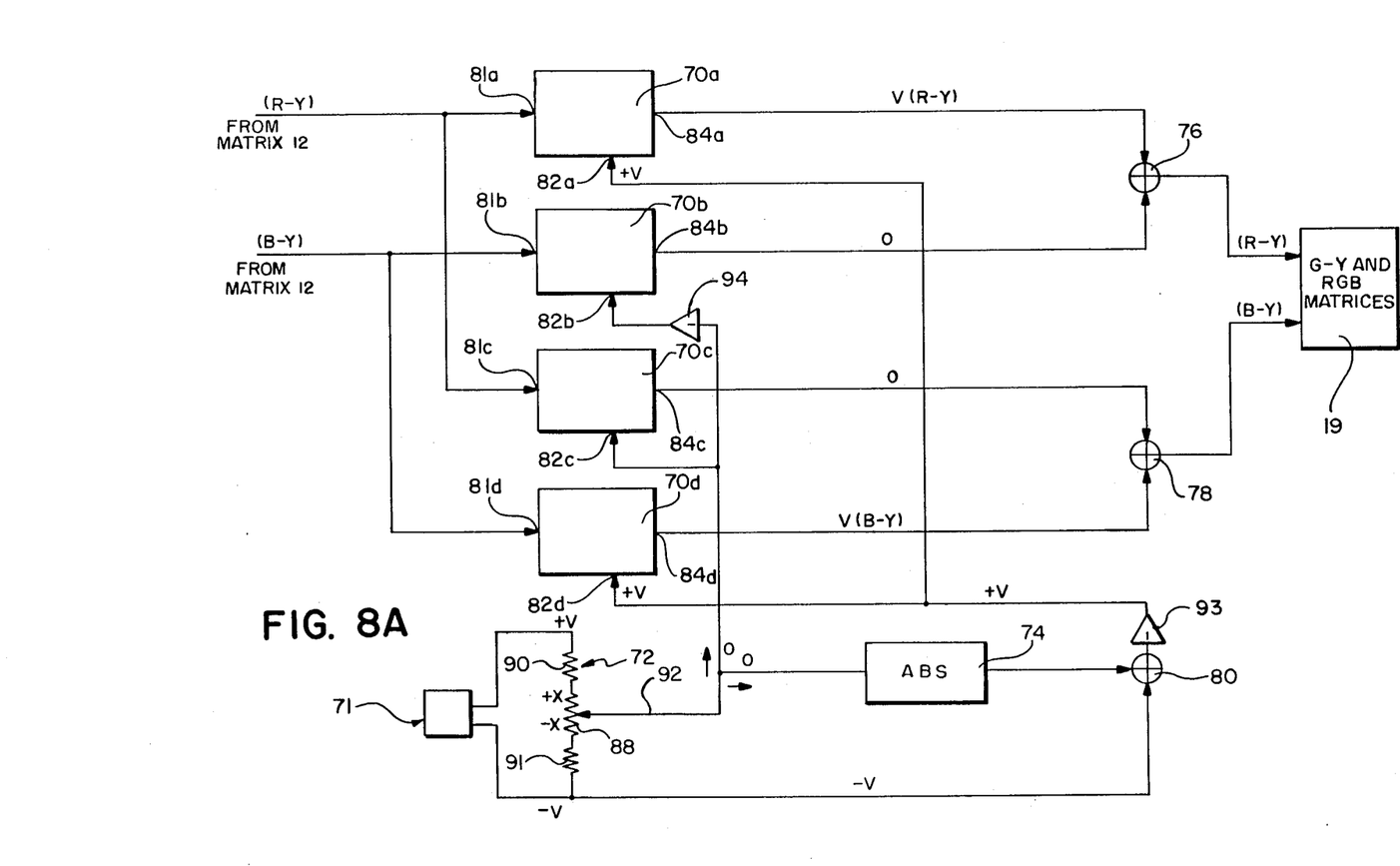
FIGS. 8A and 8B are simplified block diagrams of a second exemplary embodiment of the hue controller in conjunction with a novel color gain controller, in which the hue controller is in a centered, inactive position in FIG. 8A, and in an active, color adjusting position in FIG. 8B.

In another exemplary embodiment, there is shown in FIG. 8 another apparatus for achieving the aforementioned color hue control. The primary elements of the present embodiment include two pairs of four quadrant multipliers 70a through d, a color saturation (gain) adjuster indicated at 71, a color hue adjuster indicated at 72, an absolute value circuit 74, and adders 76, 78 and 80. Briefly in operation, R-Y signals from matrix 12 are fed to the multiplying inputs 81 of the multipliers 70a and 70c, while the B-Y signals from matrix 12 are fed to the multiplying inputs 81 of the other multipliers 70b and 70d. Selective adjusting of the B-Y and R-Y component levels out of the multipliers 70 is achieved by DC signals fed to the multiplier inputs 82a through d. In this manner, the signals generated at each multiplier output 84a through d is an algebraic product of the two input signals 81, 82.

Figure 8B:
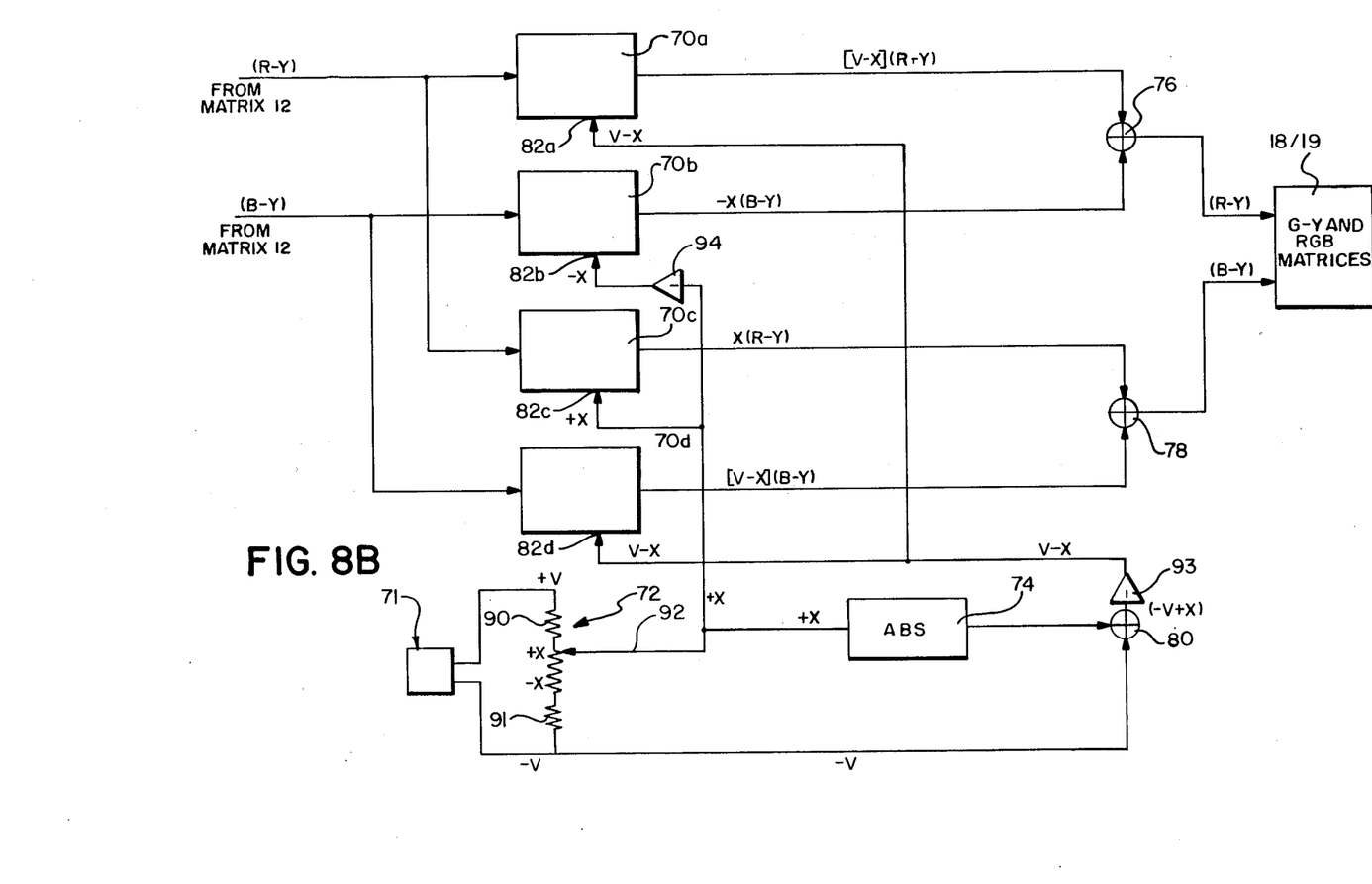

The present embodiment operates in a manner that changes in the DC signals to the multipliers at the inputs 82, causes changes in the levels of the R-Y and B-Y component levels similar to those described with reference to the previous embodiment, in order to selectively vary the color hue. More specifically, when the hue adjuster 72 is moved from a centered position to an upward +x position, for example, as shown in FIG. 8B, the outputs from the first and second multipliers 70a, 70b are such that there is a decrease in the R-Y signal coming out of the first multiplier 70a and a corresponding increase in the level of the B-Y component coming out of the second multiplier 70b. The sum of these two signals forms the (R-Y) signal inputs to the matrices 18, 19 so that, for example, colors which are red take on a yellowish hue. At the same time, there is a decrease in the B-Y component level out of the fourth multiplier 70d, and an increase in the R-Y component out of the third multiplier 70c, with their sum being fed to the (B-Y) signal inputs of the matrices 18, 19 so that colors which are blue become more reddish in hue. These component level changes are identical to those summarized in the diagram of FIG. 7 for movement of the color control in the "upward direction".

On the other hand, movement of the color hue controller in the opposite downward direction (not shown) towards the —x position decreases the R-Y component signal out of the first multiplier 70a and increases the B-Y component signal out of the second multiplier 70b. At the same time, the R-Y component signal out of the third multiplier 70c is decreased, and the B-Y component generated out of the fourth multiplier 70d is increased. These component level changes are also summarized in FIG. 7 in correspondence to movement of the color control in the "downward" direction.

The aforementioned color hue adjustment is accomplished in the present embodiment by means of the color hue controller 72 (FIG. 8A) which includes an adjustable potentiometer for generating a selected voltage level between +x and —x volts with a center location at zero volts. The hue adjuster 72 includes a potentiometer resistor 88 tied at opposite ends to upper and lower resistors 90, 91 which in turn are tied to +V and —V leads from the gain controller 71. Thus, when the potentiometer wiper arm 92 is centered at the zero position on the potentiometer resistor 88 as shown in FIG. 8A, a zero signal is fed to the DC inputs 82b, 82c of the second and third multipliers to generate zero signal outputs therefrom. At the same time, the R-Y and B-Y inputs to the first and fourth multipliers 70a, 70d are unaffected by the hue adjuster 72, because the DC signals fed to inputs 82 of the multipliers 70a, 70d are identical +V signal outputs from gain controller 71. In this manner, the overall gain may be adjusted independently of color hue. More precisely, when the hue adjuster 72 is centered as shown in FIG. 8A, a —V signal from the —V lead of the gain adjuster 71 is fed to the adder 80 where it is added to the zero output from the potentiometer arm 92, and then inverted by inverting amplifier 93 to generate a +V signal, which is then fed to the inputs 82 of the first and fourth multipliers 70a, 70d. Thus, the levels of the R-Y and B-Y signals from matrix 12 are affected only by the output from the gain controller 71.

On the other hand, if the hue potentiometer is adjusted upward, for example as shown in FIG. 8B, so that the potentiometer arm 92 is at +x, then the +x signal is fed to the adder 80 via the absolute value circuit 74. In addition, the —V signal from the —V lead of gain adjuster 71 is fed to the adder 80. At inverting amplifier 93 the summed signal is inverted and this difference signal, V—x, is fed to the inputs 82 of the first and fourth multipliers 70a, 70d, so that reduced R-Y and B-Y component levels are output therefrom. At the same time, the inverted B-Y signal output from the second multiplier 70b and the R-Y signal output from the third multiplier 70c are increased by feeding the +x signal from the wiper arm 92 to the inputs of the second and third multipliers 70b, 70c, with the signal to the second multiplier input 82b being fed through an unity gain inverting amplifier 94. In this manner, the (R-Y) signal inputs to matrices 18, 19 include a reduced R-Y component from the first multiplier 70a, and an increased —(B-Y) component from the second multiplier 70b; whereas, the (B-Y) signal inputs to matrices 18, 19 include a reduced B-Y component from the fourth multiplier 70c and an increased R-Y component from the third multiplier 70c.

Conversely, if the hue potentiometer 72 is adjusted in the downward direction (not shown) to the —x level, the —x signal is operated on by the absolute value circuit 74 to generate a +x signal output which is added at the summer 80 to the —V signal, then inverted, and the resulting V—x signal is fed to the inputs 82a, 82d of the first and fourth multipliers. At the same time, the —x signal from the potentiomer arm 92 is fed to the input 82 of the third multiplier 70c, and as well as being inverted by amplifier 94 and fed to the input 82 of the second multiplier 70b. This results in a decreased R-Y component level from the first multiplier 70a, and increased B-Y component level from the second multiplier 70b; as well as an decreased B-Y component level from the fourth multiplier 70d, and an increased −(R-Y) component level out of the third multiplier 70a. These signal level changes duplicate those summarized in FIG. 7.

Figure 9A:
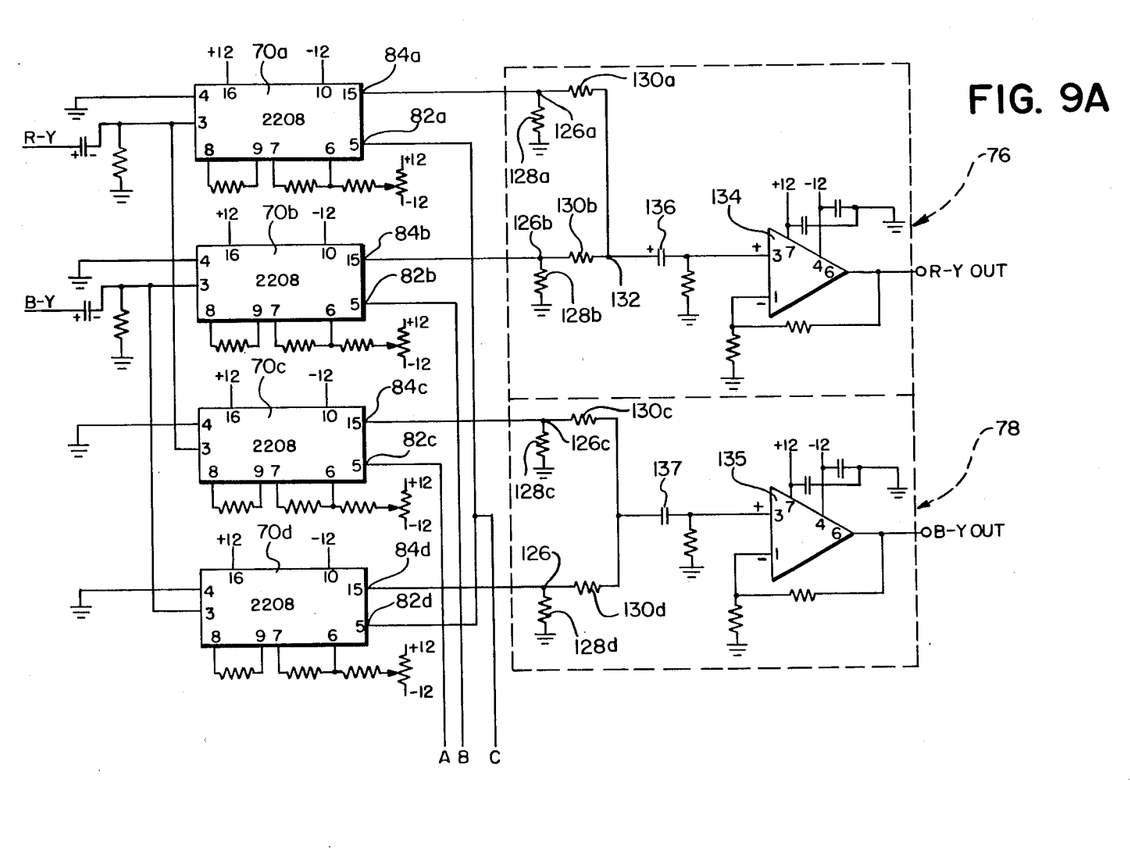
FIGS. 9A and 9B are detailed diagrams of the gain and hue controllers of FIGS. 8A and 8B.
Figure 9B:
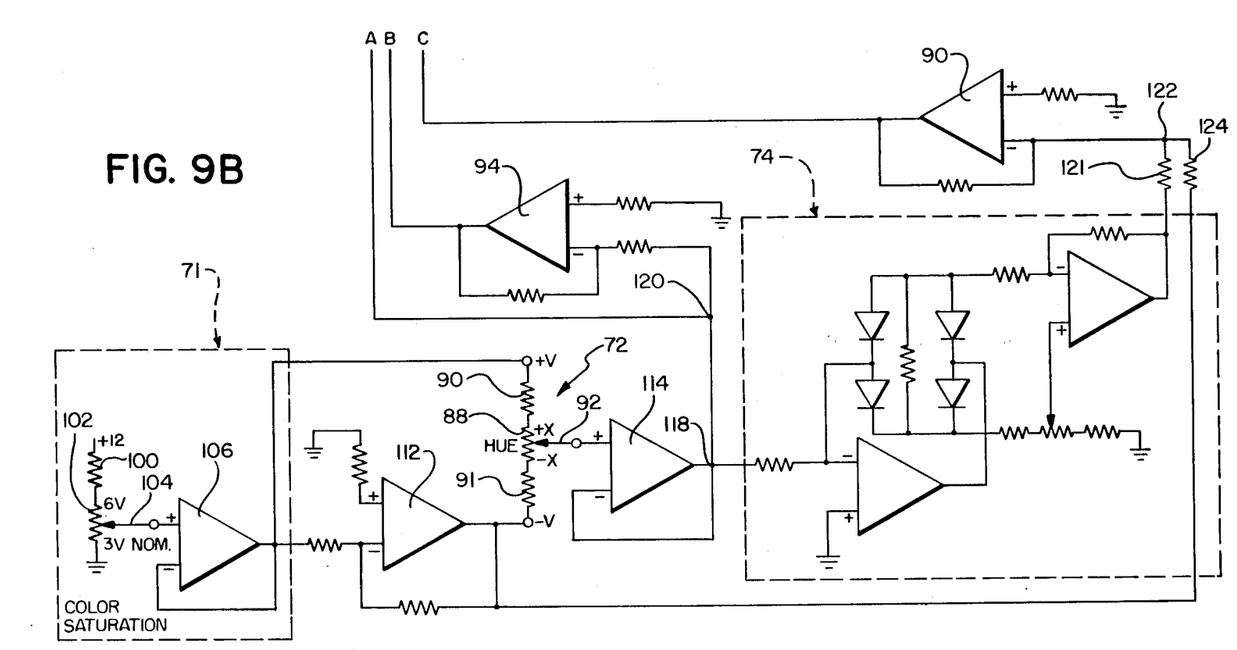

In order to describe the elements set forth in FIGS. 8A and 8B in greater detail, attention is now turned to the more detailed diagrams of FIGS. 9A and 9B. As shown in FIG. 9B, gain adjuster 71 includes (i) an adjustable potentiometer formed by series resistors 100, 102 tied between the positive voltage supply and ground, and (ii) an adjustable wiper arm 104 which moves across resistor 102 and which is tied to the non-inverting input of a voltage follower amplifier 106. The output of the voltage follower 106 is (1) tied to the upper resistor 90, which in turn is tied to the upper end of resistor 88 of the hue potentiometer 72, and (2) to the inverting input of a unity gain non-inverting amplifier 112, the output of which is tied to the lower resistor 91, which in turn is tied to the lower end of potentiometer resistor 88. In this manner, a signal level V selected at the color gain potentiometer 71 appears at the input to the upper resistor 90, and the negative equivalent of that selected signal level appears at the input to the lower resistor 91. Since the DC signal level fed to the input 82a through d of the multipliers 70 is a function of the selected signal level V, the color gain potentiometer is a convenient method for adjusting the overall gain of the signals fed to the matrices 18, 19, while still permitting the aforementioned color hue adjustment.

As discussed in the previous embodiment, linear (non-vector) addition of the B-Y and R-Y component levels may be accomplished to closely approximate a vector addition equivalent; provided, however, that the change in signal level of the R-Y and B-Y components is sufficiently small. This is accomplished in the present embodiment by providing equal value upper and lower resistors 90, 91 which have resistance values approximately two times greater than the value of the potentiometer resistor 88 so that the change in the levels of the R-Y and B-Y components is no more than about ±30% of their signal levels. This represents a phase shaft of no more than about ±30°.

Proceeding from the hue potentiometer 72, the potentiometer arm 92 is tied to the non-inverting input of a voltage follower amplifier 114, the output of which is tied to the input of the absolute value circuit 74 via a junction 118. The absolute value circuit 74 is a conventional circuit which is shown in FIG. 9 but which will not be described herein in further detail. At the junction 118, the signal is also fed directly to the input 82c of the third multiplier 70c as well as being tapped from a junction 120 and inverted by the unity gain inverting amplifier 94 and fed to the input 82b of the second multiplier 70b. At the same time, the output from the absolute value circuit 74 is fed via a summing resistor 121 to a summing node 122 where it is added to the −V output from the amplifier 112 via a branch 123 and summing resistor 124. The summing node 122 is tied downstream to the inverting input of the unity gain inverting amplifier 90, the output of which is tied to the inputs 82 of the first and fourth multipliers 70a, 70d.

In an exemplary embodiment, the four-quadrant multipliers 70 are XR-2208 operational multipliers manufactured by EXAR. These multipliers each have X and Y inputs at pins 3 and 5, and high-frequency outputs at pins 15. Furthermore, the X and Y signal gain is set by resistors across pins 8, 9 and pins 6, 7 so that, for example, a two-volt peak-to-peak input signal, at pin 3, has a maximum peak-to-peak voltage output at pin 15 of about 1.5 volts before clipping occurs. Downstream of the multiplier outputs 84a through d are junctions 126a through d, respectively having (i) load resistors 128a through d tied to ground, and (ii) summing resistors 130a through d; with resistors 130a, 130b having their downstream ends tied to a summing node 132, and resistors 130a, 130d having their downstream ends tied to a summing node 133. Nodes 132, 133, respectively, in turn are tied to non-inverting inputs of summing amplifiers 134, 135, respectively, through DC decoupling capacitors 136, 137, respectively. The summing amplifiers 134, 135 provide sufficient signal gain to overcome the attenuation occurring downstream of the multiplier outputs 84. As shown in FIG. 9A, the summed outputs from the first and second multipliers 70a, 70b are fed to the (R-Y) inputs of matrices 18, 19, whereas the summed outputs of the third and fourth amplifiers 70a, 70d are fed to the (B-Y) inputs of the matrices 18, 19.

I claim:
1. A video system comprising:
   a. means, in response to light reflected from an object, for generating video signals which represent an image of the object, and for converting these video signals to first and second color signals;
   b. control means for adjusting the levels of the first and second color signals to generate a change in color of the image, the control means including
      (1) first signal level changing means, including a first input receptive of the first color signal and a second input receptive of the second color signal, for changing the level of the first color signal and for generating a first signal output thereof, and for changing the level of the second color signal, and generating a second signal output thereof,
      (2) first means for combining the first and second signal outputs to generate a first color adjusted signal,
      (3) second signal level changing means, which include a third input receptive of the second color signal and a fourth input receptive of the first color signal, the second signal level changing means being coupled to the first signal level changing means in a manner that when the level of the first color signal received at the first output is changed and the level of the second color signal received at the second input is changed, the level of the second color signal received at the third input is also changed and a third output is generated thereof, and the level of the first color signal received at the fourth input is also changed and a fourth signal output is generated thereof,
      (4) second means for combining the third and fourth outputs to generate a second color adjusted signal;
   c. means for converting the third and second color adjusted signals to red, blue and green color signals; and
   d. means, responsive to the red, blue and green color signals, for displaying the image of the object; wherein:
   e. the first level changing means includes means for changing the level of the first color signal in a first direction while changing the level of the second color signal in a second direction which is opposite to the first direction; and f. the second signal level changing means including means for (i) changing the second color signal received at the third input in the first direction when the first color signal received at the first input is changed in the first direction, and (ii) for changing the level of the first color signal received at the fourth input in the second direction when the level of the second color signal received at the second input is changed in the second direction;

wherein:

g. the first level changing means includes
   (1) first multiplier means, including the first input for receiving the first color signal and a control input for receiving a first control signal, the first multiplier means operating so as to multiply the color signal received from the first input with the first control signal to generate the first output signal which is fed to the first combining means,
   (2) second multiplier means, including the second input for receiving the second color signal and a control input for receiving a second control signal, the second multiplier means operating so as to multiply the second color signal from the second input with the second control signal to generate the second output signal which is fed to the first combining means;

h. the second level adjusting means includes
   (1) third multiplier means, including the third input for receiving the second color signal and a control input for receiving a third control signal, the third multiplier means operating so as to multiply the second color signal received from the third input with the third control signal to generate the third output signal which is fed to the second combining means,
   (2) fourth multiplier means, including the fourth input for receiving the first color signal and a control input for receiving a fourth control signal, the fourth multiplier means operating so as to multiply the first color signal from the fourth input with the fourth control signal to generate the fourth output signal which is fed to the second combining means; and i. the control means further includes
   (1) means for generating an output signal having a selected level x in a range $-x </= 0 </= x$,
   (2) means, receptive of the output signal, for generating the second and the fourth control signals therefrom so that the second and fourth control signals have equal magnitudes and opposite polarities, and for feeding the second control signal to the control input of the second multiplier means and the fourth control signal to the control input of the fourth multiplier means,
   (3) means, receptive of the output signal, for generating the first and third control signals in a manner that changes in the level of the output signal cause changes in the opposite direction in the levels of the first and third control signals, and
   (4) means for feeding the first control signal to the control input of the first multiplier means and the third control signal to the control input of the third multiplier means;

wherein:

j. the output signal generating means includes first potentiometer means having an output range between $-x$ and $x$; and k. the first and third control signal generating means includes
   (1) means, receptive of the output signal, for generating a signal which is an absolute value of the output signal,
   (2) gain adjusting means for generating a signal having a selected level V,
   (3) means for combining the absolute value signal with the V level signal to generate a signal output which is a difference signal between the V level signal and the absolute value signal, and
   (4) means for feeding the difference signal to the control inputs of the first and third multiplier means.

2. The video signal as set forth in claim 1 wherein the gain adjusting means includes
   (1) second potentiometer means for generating a signal having a selected maximum level V within the range of $-V \leq O \leq +V$,
   (2) means for feeding a $+V$ portion of the V level signal to a first input of the potentiometer means, and
   (3) means for feeding a $-V$ portion of the V level signal to a second input of the second potentiometer means, in a manner that the output x of the second potentiometer means has a range $-V < -X \leq O \leq +X < +V$.

* * * * *